Patented Oct. 6, 1936

2,056,436

UNITED STATES PATENT OFFICE 2,056,436

MOLDING RESINOUS MATERIALS

James L. Rodgers, Jr., Toledo, Ohio, and Arthur M. Howald, Pittsburgh, Pa., assignors, by mesne assignments, to Plaskon Company, Incorporated, a corporation of Delaware No Drawing. Application February 25, 1932
Serial No. 595,230

4 Claims. (Cl. 18—55)

This invention relates to molding resinous materials; and it comprises an improvement in the art of making molded articles from heat-setting resins, with or without a filler, the method being particularly applicable to resins made from urea and also useful elsewhere, wherein a molding powder containing resins is heated and malaxated at a temperature well below the setting temperature until the mass is free from as much adsorbed air as possible and is warmed throughout, the material, still warm, being then transferred to a mold and hot-pressed or cured in the usual manner; all as more fully hereinafter set forth and as claimed.

In the copending application Serial No. 494,693 filed November 10, 1930 by Arthur M. Howald, one of the present applicants, and in the various divisions thereof, methods of preparing formaldehyde-urea compositions, commercially satisfactory for hot pressing are disclosed and claimed. The particular procedures and compositions so prepared by Howald are described in more detail post. The present joint invention is directed to an improvement in such methods, wherein such formaldehyde-urea molding compositions are further treated prior to hot pressing to obtain certain advantages more fully described post.

In said Howald application Serial No. 494,693, the broad method disclosed comprises reacting urea with formaldehyde in aqueous solution with a correlated and limited molar ratio, acidity and temperature, to produce thinly mobile, slightly acid liquids capable of entering capillaries and free of gummy condensation or resinified products, and then arresting the reaction and condensation, prior to any substantial resinification, by evaporating the water at relatively low temperatures, the drying temperature being sufficient to remove substantially all the water and volatiles, but being insufficient to resinify the formaldehyde-urea product. In that way, there are obtained dry, soluble, fusible, heat-hardening potential resins directly convertible into insoluble, infusible, stable resin continua by a subsequent hot pressing. These potential resins so obtained have the formaldehyde combined with the urea in substantially the same ratios desired in the final molded article, namely, in molar ratios between 1.55:1 and 1.05:1 as described and claimed in Serial No. 494,693; the said ratios being employed from the very beginning of the process and no excess formaldehyde being present at any stage. In certain of the procedures there described, the thinly mobile, non-gummy, slightly acid liquid having advantageously a pH between 5 and 6, is taken up in sufficient fibrous absorbent filler, such as sulfite pulp, to form a moist slightly acid impregnated fibrous mass which is then dried in a current of warm air to arrest the reaction and obtain the desired dry, fusible, heat-hardening molding compositions containing said fibrous filler impregnated with said potential resin or dry, fusible, low-temperature, acid-condensed, initial condensation product; the dry, impregnated mass being ground to form a molding powder. Such molding powders are highly satisfactory for making hot pressed molded articles but are quite bulky.

In the present joint invention, such high grade but bulky molding powders are prepared in substantially the same way but are malaxated, that is, mechanically worked and heated at moderate temperature, to produce a uniformly warmed, compacted putty-like plasticized mass which is then introduced, while still warm and plastic, into the mold and hot pressed. By introducing a uniformly warmed, compacted plastic mass into the mold, instead of employing the bulky molding powder, we obtain the various advantages and improvements described post. Although such molding powders containing these dry fusible heat-hardening formaldehyde-urea condensation products are quite sensitive to heat, that is, quickly heat-harden, we have found that by simultaneously mechanically working and heating them to moderate temperatures, say temperatures not exceeding 95° C., they can be compacted and plasticized by malaxation without substantial loss of fusibility.

Making molded articles from heat-setting synthetic resins of various kinds is now a large industry. Ordinarily, molding is accomplished by supplying a charge of molding body to a mold and applying heat and pressure. The heat penetrates throughout and the resin sets. This molding process is necessarily limited to articles in which one dimension is rather thin, because of the necessity of propagating heat throughout the mass. The heat from the two sides must meet at the center, or there will be uncured portions. Apart from this limitation to making thin articles, the operation is somewhat expensive, because of the length of time required for the various actions to be performed. The time in the mold is usually a large factor in the cost of the finished article. Sometimes filler and resin are incorporated together to form a composite mass or body and a molding powder made of this; sometimes, a composite mixture of filler and fine powdered resin is used.

In the described operation, it is necessary that under the heat of the mold, the resin shall liquefy enough to flow into all voids; flow being, of course, assisted by the pressure. In filling the voids, air and moisture must be expelled, if a sound article is to be produced. After this flow has occurred, the further action of the heat is to produce internal chemical changes in the resin which convert it into an infusible, insoluble body; by "infusible" meaning not fusible at the molding temperature. The first stage in this operation, which may be called the flow period, must be complete before the second, or curing, occurs.

It is the object of this invention to reduce the time required in the flow period and the time required to bring the interior of the body to curing temperature. To this end, the molding powder is first warmed and malaxated. By so doing, much of the contained air and moisture which may be in the voids is expelled and in addition heat is spread throughout the mass even though the resin be of low conductivity, so that there is a reduction in the amount of heat duty required of the mold. To the extent that the material is warmed in this malaxation, the heating duty on the mold in curing is reduced, operation is quicker or much thicker objects can be molded. Mostly, both results are accomplished.

The present invention is an improvement in the manufacture of hot-pressed, hot-set molded articles from dry molding compositions containing products derived from the condensation of urea and formaldehyde. Many ways are described of securing condensation between these two bodies and their products, when they are of such nature as to permit mixture with a filler, can be so mixed and malaxated. Many of the methods proposed for making such condensation products are not wholly reliable and it is considered better in the present invention to use products made in various special ways as described in certain copending applications; Serial No. 481,807, filed September 13, 1930; Serial No. 494,693, filed November 10, 1930; Serial No. 484,719, filed September 26, 1930; Serial No. 578,744, filed December 3, 1931; Serial No. 597,425, filed March 7, 1932; all of these applications being filed by Arthur M. Howald, one of the present inventors. As described in those copending applications of Howald, dry, fusible, formaldehyde-urea products, advantageous in molding compositions for hot pressing, may be obtained by reacting urea with formaldehyde in slightly acid aqueous solution (partially neutralized commercial formaldehyde) at low temperatures and then arresting reaction short of resinification, by evaporating the water and other volatiles by low temperature drying, the drying temperature being sufficient to remove the said uncombined volatiles but insufficient to undesirably carry forward the reaction and resinify the formaldehyde-urea condensation products. In one of these applications Serial No. 494,693 acknowledged ante, aqueous formaldehyde and urea are allowed to react with each other in such solutions in the molecular proportion of 1.5:1 and in the cold, the temperature advantageously not being allowed to rise above 30° C. or thereabouts. After reaction has gone as far as may be desired, which is ordinarily a matter of 4 to 10 hours, depending upon the temperature, the thin mobile, non-gummy, slightly acid liquid obtained is mixed with wood flour in amount sufficient to allow production of a moist mass. This will represent, using ordinary commercial 35 per cent formaldehyde with the appropriate quantity of urea, a mixture giving in the final molded article 40 per cent of wood flour. The slightly acid moist mass is dried in a current of air at a low temperature; the temperature of the mass being kept below 80° C. This results in an agglomerated or lumpy mass. The mass is ground to form a molding powder. The molding powder so obtained is a finely divided, bulky material.

In the present invention, the molding powder made as just described is fed into a jacketed mixer and malaxated at a temperature obtained with 10 pounds of steam in the jacket, until most of the moisture and air still present are removed. This will require about 2 minutes and the mass will reach a temperature of 90° C. The hot malaxated mixture is put in a mold and curing heat and pressure applied.

Some urea-formaldehyde molding compositions are so made as not to set until a rather sharply defined temperature is obtained. For example, in another and copending application Serial No. 578,744, there is described and claimed the use of benzoyl peroxid, beta-bromohydrocinnamic acid and other substances which decompose at some definite temperature with the liberation of free acid. Those substances are latent acid catalysts and as stated in the copending application may be incorporated with other ingredients during the grinding step to form a homogeneous molding powder. The new free acid developed from these latent catalysts by thermal decomposition during the hot pressing enormously accelerates the heat-setting. With benzoyl peroxid, development of acid begins at about 110° C. With such a composition malaxation can be safely effected at temperatures within 15 or 20° C. of this.

The heating and mechanical working of any molding powder, that is malaxating, under the present invention, may be controlled to give a variety of results. Where desired, malaxation is so controlled as to leave a material which is still a powder; is a free running preparation. Or malaxation may be carried far enough to give a putty-like consistency. The degree to which malaxation is carried depends upon the particular results desired.

Where the product is still a free running warm material, there is the advantage that the bulk is considerably reduced. Most molding powders are quite bulky and this causes expense in molds. Any reduction of the bulk of the powder without otherwise interfering with its properties, decreases the amount of movement of press and mold parts required; the compression ratio in molding is less and mold recesses may be shallower. Other things being equal, a mold is the more expensive the deeper the mold recesses. Considerable reduction in bulk of a molding powder may be obtained in the present invention with removal of much of the air without interfering with its properties or qualities; and cheaper molds and molding are possible. In operating in this way, of course, temperatures are so controlled that the binder is not softened or liquified to any substantial extent in malaxating.

On the other hand, at times it is desirable to carry malaxation so far as to convert the pulverulent composition into a putty-like plastic state. More of the mechanical advantages of the present invention are thereby obtained and the only change in the present art required is as regards the use of different measuring scoops or the like in charging the mold. Somewhat higher temperatures can be used where this plasticization is permissible and the molding charge put in the mold hotter. A putty-like mass can be easily subdivided in slugs or molding blanks and this sometimes offers a convenience.

In molding, as stated, there are successive recognizable stages. In point of time, air leaves a void, binder flows in the void and the walls are brought together and then setting takes place. To the extent that air can be expelled and the material warmed, time is saved in the operation in the mold; molding can be quicker or thicker objects can be molded. It is also possible, under the present invention, to mold readily articles of more complicated shapes; additional time is given for the powder to fill recesses in the mold.

With putty-like material it is advantageous to place it in the mold while it is still in the heated state. Then in molding, the shaping of the heated putty-like plastic composition occurs quickly; immediately or soon after the closing of the mold. Most of the molding time may be utilized in hardening the molded articles. The time during which the molding composition must be retained in the mold is reduced.

In the usual processes of molding plastic compositions, the flowing and shaping steps overlap the heat-setting or hardening step. In fact, in many instances these two steps simultaneously occur. With great overlapping, hardening may be so quick that proper flow is not obtained and imperfect articles result.

In the present procedure, these two steps are more or less separated, so they become individual phases in the molding operation. By such separation a much better control of the complete process is obtained. When the malaxation is so effected that a putty-like material is obtained this takes shape as soon as pressure is applied. The material is converted into a fluent, plastic state prior to introduction into the mold. During the molding, pressure is then only needed to give shape and the heat supplied by the mold walls is delivered at a higher heat plane in the mold; is utilized almost entirely to heat-harden and set the shaped article.

What we claim is:—

1. In the manufacture of molded articles with increased efficiency of molding apparatus from dry, relatively bulky molding powders substantially free of volatiles and containing dry, readily fusible, urea-formaldehyde reaction products capable of heat-hardening, the improved process which comprises heating and mechanically working, at a temperature not exceeding 95° C. a homogeneous, finely divided, but bulky molding powder containing such urea-formaldehyde reaction products in a dry, fusible condition but capable of hardening at a temperature above 95° C., until a warm plastic composition having a putty-like consistency is obtained, introducing the putty-like material so obtained, while still warm and plastic, into a hot mold and then molding the heated putty-like mass under sufficient heat and pressure to produce shaped articles and to heat-harden said urea-formaldehyde reaction product into an infusible, insoluble condition.

2. As an improvement in the manufacture of pressure-shaped, heat-hardened, molded articles, from urea and formaldehyde, the steps which comprise impregnating a fibrous cellulose filler with sufficient of a thin mobile, slightly acid, aqueous solution of a soluble, fusible, low temperature urea-formaldehyde reaction product to form a moist mass, drying the slightly acid moist mass to remove water and other volatiles without substantial loss of the fusibility, said drying being effected at temperatures below 80° C., grinding the dry mass of impregnated fibrous filler to a fine bulky powder, and then converting said bulky powder into a uniformly warmed, compacted, putty-like, plasticized mass without loss of fusibility by warming and malaxating said powder at temperatures not exceeding 95° C., until said plasticized mass is obtained and then introducing the uniformly warmed, compacted, plasticized mass in molds and applying sufficient heat and pressure to form a shaped, molded article and to convert the urea-formaldehyde product in said shaped article into an infusible, insoluble body.

3. The process of claim 2 wherein said fusible urea-formaldehyde reaction product contains formaldehyde and urea combined in approximately the molar ratio of 1.5:1.

4. The process of claim 2 wherein said powder is converted into said plasticized mass by malaxating at a temperature of about 90° C. for a few minutes.

JAMES L. RODGERS, JR.
ARTHUR M. HOWALD.